UNITED STATES PATENT OFFICE.

BENJAMIN C. FROBISHER, OF BROCKTON, ASSIGNOR TO CHARLES E. AMES, OF WHITMAN, MASSACHUSETTS.

STOVE-POLISH.

SPECIFICATION forming part of Letters Patent No. 421,564, dated February 18, 1890.

Application filed October 29, 1889. Serial No. 328,557. (No specimens.)

*To all whom it may concern:*

Be it known that I, BENJAMIN C. FROBISHER, of Brockton, in the county of Plymouth and State of Massachusetts, have invented a new and useful Improvement in Stove-Polish, which improvement is fully set forth in the following specification.

My invention consists of a liquid stove-polish. In preparing it I mix water, silicate of soda, crude plumbago, and glycerine. This has the advantages, among others, over other preparations of crude plumbago and of crude plumbago mixed with fatty material that it will adhere to iron which has been burned or oxidized even when the latter is again heated, will not easily burn off, emits no odor upon the application of heat, and will prevent dust from flying when it is applied to metal. I sometimes add black oxide of manganese to improve the color.

I have found the following proportions of materials to produce the best results, though they may be considerably varied, namely: forty-six gallons of water, two gallons of silicate of soda, sixty pounds of crude plumbago, one gallon of glycerine, and twelve pounds of black oxide of manganese, if the latter is used.

In preparing this polish it will be found best to dissolve the silicate of soda and the glycerine in about five gallons of hot water and afterward to add the plumbago, the black oxide of manganese, if it is used, and the rest of the water, either cold or hot, all in the quantities and weights above named. The plumbago and black oxide of manganese do not unite with the other ingredients of the compound, and are therefore best added after the soluble silicate of soda and the glycerine have been dissolved. The mixture in all cases, whether the black oxide of manganese is used or not, is intended to be shaken before application.

Having thus described my invention, what I claim as new, and desire to secure by Letters Patent, is—

1. The composition of matter or stove-polish, consisting of water, silicate of soda, and crude plumbago, combined with glycerine, substantially as and for the purpose set forth.

2. The composition of matter or stove-polish, consisting of water, silicate of soda, crude plumbago, and glycerine, combined with black oxide of manganese, substantially as and for the purpose set forth.

BENJAMIN C. FROBISHER.

Witnesses:
PAUL REVERE,
ARABELLA G. REVERE.